(12) United States Patent
Satone et al.

(10) Patent No.: US 8,704,157 B2
(45) Date of Patent: Apr. 22, 2014

(54) OPTICAL ROTARY ENCODER AND MANUFACTURING METHOD THEREOF

(75) Inventors: Toshikazu Satone, Chiyoda-ku (JP);
Masahiko Yoshida, Chiyoda-ku (JP);
Kousuke Shamoto, Chiyoda-ku (JP);
Takumi Asano, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 13/257,771

(22) PCT Filed: Apr. 14, 2009

(86) PCT No.: PCT/JP2009/057518
§ 371 (c)(1),
(2), (4) Date: Sep. 20, 2011

(87) PCT Pub. No.: WO2010/119513
PCT Pub. Date: Oct. 21, 2010

(65) Prior Publication Data
US 2012/0006982 A1    Jan. 12, 2012

(51) Int. Cl.
*G01D 5/34* (2006.01)
(52) U.S. Cl.
USPC .................................................. 250/231.13
(58) Field of Classification Search
USPC ................. 250/231.1–231.18, 233; 33/1 PT, 33/703–708; 702/163; 356/615–617
See application file for complete search history.

(56) References Cited

U.S. PATENT DOCUMENTS

| | | | | | |
|---|---|---|---|---|---|
| 4,338,517 | A | * | 7/1982 | Perrine | 250/231.13 |
| 5,057,684 | A | * | 10/1991 | Service | 250/231.13 |
| 5,393,201 | A | * | 2/1995 | Okutani et al. | 417/16 |
| 5,640,007 | A | * | 6/1997 | Talbott et al. | 250/231.15 |
| 2006/0176332 | A1 | * | 8/2006 | Chikamoto | 347/20 |
| 2006/0250292 | A1 | * | 11/2006 | Yamagata | 341/192 |

FOREIGN PATENT DOCUMENTS

| | | |
|---|---|---|
| JP | 8-205479 A | 8/1996 |
| JP | 10-002760 A | 1/1998 |
| JP | 10-019603 A | 1/1998 |
| JP | 2006-300873 A | 11/2006 |

\* cited by examiner

*Primary Examiner* — Thanh Luu
*Assistant Examiner* — Renee Naphas
(74) *Attorney, Agent, or Firm* — Sughrue Mion, PLLC

(57) ABSTRACT

A rotating shaft; a boss that has a fitting hole formed in a center portion thereof, has a clean adhering surface at an end thereof, and is configured so that the rotating shaft is fitted into the fitting hole while the boss is fixed to the rotating shaft by a fixing member; a pulse disk that has an interference-fit hole formed in a center portion thereof for the rotating shaft, has a clean adhesion-receiving surface in a surrounding of the interference-fit hole, is configured so that the rotating shaft is pressed into the interference-fit hole and so that the adhesion-receiving surface is adhered to the adhering surface of the boss by an adhesive agent, and has a position detecting pattern formed thereon; a light emitting element that radiates light; and a light receiving element that receives the light from the light emitting element via the position detecting pattern are included.

7 Claims, 1 Drawing Sheet

OPTICAL ROTARY ENCODER AND MANUFACTURING METHOD THEREOF

CROSS REFERENCE TO RELATED APPLICATIONS

This application is a National Stage of International Application No. PCT/JP2009/057518 filed on Apr. 14, 2009, the contents of all of which are incorporated herein by reference in their entirety.

FIELD

The present invention relates to an optical rotary encoder and a manufacturing method thereof. The present invention specifically relates to a rotary encoder that is used for detecting a rotating position of a servo system, that has a high resolution, and that detects an absolute position of a tool included in a machining tool device or the like with a high level of precision.

BACKGROUND

A rotating member in a rotary encoder including a pulse disk provided with a slit pattern (a position detecting pattern) and a boss that fixes the pulse disk to a motor shaft and being configured so that the pulse disk and the boss are adhered and fixed to each other by an adhesive agent is conventionally disclosed (see, for example, Patent Literature 1).

CITATION LIST

Patent Literature

Patent Literature 1: Japanese Patent Application Laid-open No. H10-2760 (page 2, FIGS. 3 and 4)

SUMMARY

Technical Problem

To enhance the precision for detecting a rotation position of a rotary encoder, it is important to precisely determine the position of the center of a pulse disk with respect to the center of a motor shaft. According to the conventional technique mentioned above, the boss is first inserted into and fixed to a dummy shaft so that an adhesive agent is applied to a pulse disk attachment surface. After the pulse disk is placed thereon and is temporarily fixed thereto, the dummy shaft is rotated slowly. In this situation, by utilizing a slit pattern on the pulse disk, a center alignment process is performed by applying a force to the outer circumference of the pulse disk such that the degree of eccentricity of the slit pattern falls within a standard range by using an optical device, and the pulse disk is definitely adhered and fixed to the boss.

The conventional technique mentioned above, however, has a problem where it takes trouble to perform the center alignment process. Also, after the center alignment process is performed by using the dummy shaft, the rotating member is removed from the dummy shaft so that the boss is re-attached to the motor shaft by using a set screw. As a result, another problem arises where a misalignment of the centers occurs between the boss and the pulse disk because of the tightening of the set screw.

In view of the circumstances described above, an object of the present invention is to obtain a rotary encoder and a manufacturing method thereof that makes it easy to align the center of the pulse disk and that reduces the misalignments of the centers.

Solution to Problem

A rotary encoder according to an aspect of the present invention includes: a rotating shaft; a boss that has a fitting hole formed in a center portion thereof, has a clean adhering surface at an end thereof, and is configured so that the rotating shaft is fitted into the fitting hole while the boss is fixed to the rotating shaft by a fixing member; a pulse disk that has an interference-fit hole formed in a center portion thereof for the rotating shaft, has a clean adhesion-receiving surface in a surrounding of the interference-fit hole, is configured so that the rotating shaft is pressed into the interference-fit hole and so that the adhesion-receiving surface is adhered to the adhering surface of the boss by an adhesive agent, and has a position detecting pattern formed thereon; a light emitting element that radiates light onto the position detecting pattern formed on the pulse disk; and a light receiving element that receives the light from the light emitting element via the position detecting pattern formed on the pulse disk.

Advantageous Effects of Invention

The rotary encoder according to the present invention achieves an advantageous effect where it is easy to align the center of the pulse disk and where the misalignments of the centers is reduced.

DESCRIPTION OF EMBODIMENTS

In the following sections, exemplary embodiments of a rotary encoder and a manufacturing method thereof according to the present invention will be explained in detail, with reference to the accompanying drawings. The present invention is not limited to the exemplary embodiments.

First Embodiment

Figure 1:
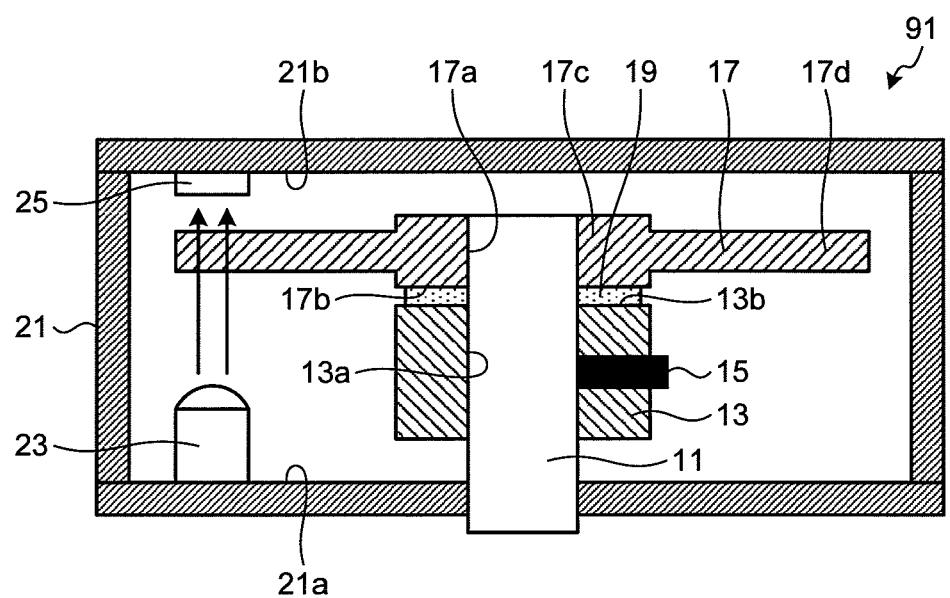
FIG. 1 is a vertical cross-sectional view of a rotary encoder according to a first embodiment of the present invention.

FIG. 1 is a vertical cross-sectional view of a rotary encoder according to a first embodiment of the present invention.

As shown in FIG. 1, an optical rotary encoder 91 according to the first embodiment includes: a rotating shaft 11; a boss 13 that has a fitting hole 13a formed in a center portion thereof, has an adhering surface 13b at an end thereof, and is configured so that the rotating shaft 11 is fitted into the fitting hole 13a while the boss 13 is fixed to the rotating shaft 11 by a set screw 15 serving as a fixing member; a pulse disk 17 that has an interference-fit hole 17a formed in a center portion thereof for the rotating shaft 11, has an adhesion-receiving surface 17b in the surrounding of the interference-fit hole 17a, is configured so that the rotating shaft 11 is pressed into the interference-fit hole 17a and so that the adhesion-receiving surface 17b is adhered to the adhering surface 13b of the boss 13 by an adhesive agent 19, and has a position detecting pattern formed thereon; a casing 21 that houses the boss 13 and the pulse disk 17 therein; a light emitting element 23 such as an LED module that is provided on a perpendicular-to-shaft face 21a of the casing 21 and that radiates light onto the position detecting pattern formed on the pulse disk 17; and a light receiving element 25 that is provided on a ceiling face 21b of the casing 21 and that receives the light from the light emitting element 23 via the position detecting pattern formed on the pulse disk 17.

The rotating shaft 11 may be a motor shaft of a servo motor. Alternatively, the rotating shaft 11 may be a rotating shaft connected to a motor shaft by a hub. It is preferable if the fitting hole 13a provided in the boss 13 is a clearance-fit hole or a transition-fit hole with respect to the rotating shaft 11 so that it is easy to insert the rotating shaft 11 therein. Another arrangement is acceptable in which the light receiving element 25 is provided on the perpendicular-to-shaft face 21a instead of on the ceiling face 21b, so that the light from the light emitting element 23 is reflected by the position detecting pattern formed on the pulse disk 17 and is received by the light receiving element 25.

The set screw 15 is screwed into the boss 13 from an outer circumferential portion of the boss 13 so as to press the rotating shaft 11 and so as to fix the boss 13 to the rotating shaft 11 by a friction force. It is preferable to provide a plurality of set screws 15 at regular intervals in the circumferential direction so that it is possible to maintain a weight balance of the boss 13.

The pulse disk 17 is made of a transparent resin. The central part thereof in which the adhesion-receiving surface 17b is formed is structured as a boss portion 17c, which is thicker than an outer circumferential portion 17d in which the position detecting pattern is formed. The boss portion 17c prevents the pulse disk 17 from tilting (i.e., having a planar misalignment) with respect to the rotating shaft 11. The position detecting pattern is a pattern that has a bright/dark contrast and is formed at regular intervals in the circumferential direction on the outer circumferential portion 17d of the pulse disk 17 by performing a chromium deposition process or the like. The positional shift (i.e., a misalignment of the centers) between the center of the interference-fit hole 17a formed in the pulse disk 17 and the center of the position detecting pattern is suppressed so as to be several micrometers or smaller.

Next, an assembly method (i.e., a manufacturing method) of the rotary encoder 91 according to the first embodiment will be explained. First, the adhering surface 13b of the boss 13 and the adhesion-receiving surface 17b of the pulse disk 17 are washed so as to remove unwanted adhered substances such as grease or the like. It is also acceptable to wash the entirety of the boss 13 and the pulse disk 17.

Subsequently, the rotating shaft 11 is fitted into the fitting hole 13a formed in the boss 13, so that the boss 13 is fixed to the rotating shaft 11 by the fixing member (i.e., the set screw 15). After that, the adhesive agent 19 is applied to the adhering surface 13b of the boss 13 and/or the adhesion-receiving surface 17b of the pulse disk 17. As the adhesive agent 19, a thermo setting adhesive agent or an adhesive agent that gets hard after a certain period of time has elapsed is used, so that the adhesive agent 19 does not get hard immediately.

Subsequently, the rotating shaft 11 is pressed into the interference-fit hole 17a formed in the pulse disk 17, and also, the adhesion-receiving surface 17b of the pulse disk 17 is adhered to the adhering surface 13b of the boss 13 by the adhesive agent 19, and the adhesive agent 19 is hardened so that the pulse disk 17 is adhered and fixed to the boss 13. The explanation of how to assemble the casing 21, the light emitting element 23, and the light receiving element 25 will be omitted.

As explained above, with the configuration of the rotary encoder 91 and the manufacturing method thereof according to the first embodiment, because the rotating shaft 11 is pressed into the interference-fit hole 17a formed in the pulse disk 17, it is easy to align the center of the pulse disk 17, and also, the misalignment of the centers is reduced. Further, if the pulse disk 17 were to be directly adhered to the rotating shaft 11 represented by a motor shaft or the like, reliability of the adhesion would be low because of unwanted grease involved in the manufacturing process of the motor (because it is not possible to wash the motor). In contrast, according to the first embodiment, because the adhesive agent 19 used for realizing the adhesion is applied after the adhering surface 13b of the boss 13 and the adhesion-receiving surface 17b of the pulse disk 17 are washed, the reliability of the adhesion is high.

Second Embodiment

Figure 2:
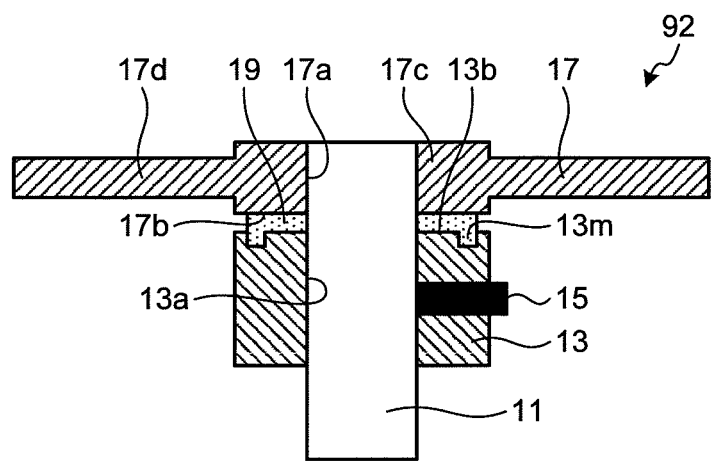
FIG. 2 is a vertical cross-sectional view of relevant parts of a rotary encoder according to a second embodiment of the present invention.

FIG. 2 is a vertical cross-sectional view of relevant parts of a rotary encoder according to a second embodiment of the present invention.

As shown in FIG. 2, in a rotary encoder 92 according to the second embodiment, an annular groove 13m into which any excess amount of the adhesive agent 19 applied to the adhering surface 13b can flow is formed in an outer circumferential portion of the adhering surface 13b of the boss 13. As a result, when the adhesion-receiving surface 17b of the pulse disk 17 is pressed against the adhering surface 13b of the boss 13, any excess amount of the adhesive agent 19 flows into the annular groove 13m, and the adhesive agent 19 therefore does not ooze to the outside. The other configurations of the rotary encoder 92 according to the second embodiment are not different from the configurations of the rotary encoder according to the first embodiment.

INDUSTRIAL APPLICABILITY

As explained above, the rotary encoder according to an aspect of the present invention is useful for a servo system that detects the absolute position of a tool included in a machine tool device or the like, with a high precision.

REFERENCE SIGNS LIST

11 ROTATING SHAFT (MOTOR SHAFT)
13 BOSS
13a FITTING HOLE
13b ADHERING SURFACE
13m ANNULAR GROOVE
15 SET SCREW (FIXING MEMBER)
17 PULSE DISK
17a INTERFERENCE-FIT HOLE
17b ADHESION-RECEIVING SURFACE
17c BOSS PORTION
17d OUTER CIRCUMFERENTIAL PORTION
19 ADHESIVE AGENT
21 CASING
23 LIGHT EMITTING ELEMENT (LED MODULE)
25 LIGHT RECEIVING ELEMENT
91, 92 ROTARY ENCODER

The invention claimed is:
1. A rotary encoder comprising:
a rotating shaft;
a boss that has a fitting hole formed in a center portion thereof, has a clean adhering surface at an end thereof;
a pulse disk that has an interference-fit hole formed in a center portion thereof for the rotating shaft, has a clean adhesion-receiving surface in a surrounding of the interference-fit hole, and has a position detecting pattern formed thereon;

a light emitting element that radiates light onto the position detecting pattern formed on the pulse disk; and a light receiving element that receives the light from the light emitting element via the position detecting pattern formed on the pulse disk, wherein the rotating shaft is a shaft of a motor, the boss is configured so that the rotating shaft is fitted into the fitting hole while the boss is fixed to the rotating shaft by a fixing member, the rotating shaft is configured to be pressed into the interference-fit hole of the pulse disk, the pulse disk is configured so that the clean adhesion-receiving surface is adhered to the clean adhering surface of the boss by an adhesive agent, and the rotating shaft and the pulse disk, and the rotating shaft and the boss are respectively fixed without using an adhesive agent.

2. The rotary encoder according to claim 1, wherein the pulse disk is configured so that a central part thereof in which the adhesion-receiving surface is formed is structured as a boss portion, which is thicker than an outer circumferential portion in which the position detecting pattern is formed.

3. The rotary encoder according to claim 1, wherein the fixing member is a set screw that is screwed into the boss from an outer circumferential portion of the boss so as to press the rotating shaft.

4. The rotary encoder according to claim 1, wherein the rotating shaft is a motor shaft of a servo motor.

5. The rotary encoder according to claim 1, wherein an annular groove into which any excess amount of the adhesive agent applied to the adhering surface flows is formed in an outer circumferential portion of the adhering surface of the boss, and the adhesive agent in the annular groove is adhered to the pulse disk and the rotating shaft via the adhesive agent applied on the adhesion receiving surface and adhering surface.

6. The rotary encoder according to claim 1, wherein the adhesive agent is configured to harden after its application.

7. A method of manufacturing a rotary encoder comprising:

a step of washing an adhering surface of a boss and an adhesion-receiving surface of a pulse disk;

a step of fitting a rotating shaft into a fitting hole formed in the boss;

a step of applying an adhesive agent to the adhering surface of the boss and/or to the adhesion-receiving surface of the pulse disk; and a step of pressing the rotating shaft into an interference-fit hole formed in the pulse disk, wherein the rotating shaft is a shaft of a motor, and in the step of fitting, the rotating shaft is fixed to the boss by using a fixing member, in the step of pressing, the clean adhesion-receiving surface of the pulse disk is adhered to the clean adhering surface of the boss by using the adhesive agent, and the rotating shaft and the pulse disk, and the rotating shaft and the boss are respectively fixed without using an adhesive agent.

* * * * *